United States Patent [19]

Rush, Jr. et al.

[11] 4,362,004
[45] Dec. 7, 1982

[54] BRAKE AND CLUTCH MECHANISM

[75] Inventors: Robert W. Rush, Jr., Elyria; Paul R. Fortlage, Medina, both of Ohio

[73] Assignee: MTD Products Inc., Cleveland, Ohio

[21] Appl. No.: 209,378

[22] Filed: Nov. 24, 1980

[51] Int. Cl.³ .................. A01D 69/08; B60K 41/24
[52] U.S. Cl. ................................. 56/11.3; 192/18 R
[58] Field of Search .............. 192/18 R, 18 A, 17 R, 192/15, 12 R, 7; 56/11.3

[56] References Cited
U.S. PATENT DOCUMENTS 4,205,509  6/1980  Miyazawa et al. ............ 192/18 R
4,213,521  7/1980  Modersohn .................. 192/18 R
4,286,701  9/1981  MacDonald ................... 192/18 R Primary Examiner—George H. Krizmanich
Attorney, Agent, or Firm—Woodling, Krost & Rust

[57] ABSTRACT

A brake and clutch mechanism for a rotary type lawn mower or the like in which first friction element (25) carried by a rotor member (24) is rotatable with the working element or blade (14) and is resiliently urged by springs (26) into clutching engagement with a clutch member (27) rotated by the driving shaft (13) of the mower, and in which second friction elements (32) are resiliently urged radially outward by springs (36) into braking engagement with a braking surface (24A) of said rotor member (24).

8 Claims, 6 Drawing Figures

BRAKE AND CLUTCH MECHANISM

FIELD TO WHICH INVENTION RELATES

Our invention relates to a brake and clutch mechanism particularly for the concurrent braking and declutching of a rotatable working element and for the concurrent unbraking and clutching of the working element. It is especially suitable for a rotary-type lawn mower so that the working element, the rotating blade, is braked against rotation at substantially the same time that the blade is declutched from the driving shaft of the mower motor and so that the blade is clutched to rotate with the shaft at substantially the same time that the blade is unbraked and permitted to rotate.

BACKGROUND ART OF THE INVENTION

The related background art known to Applicants but which does not teach, disclose or suggest the present invention, includes the following U.S. Pat. Nos.: 3,871,159—Charles R. Shriver, 4,035,994—Stephen J. Hoff, 4,141,439—James M. Lunde et al, 4,148,173—Stephen J. Hoff, 4,205,509—Takeshi Miyazawa et al.

Also related to, but distinct from, this invention is the invention disclosed and claimed in co-pending U.S. Pat. application Ser. No. 174,861 filed Aug. 1, 1980 by Gerhard R. Plamper, and assigned to the owner of this present application.

STATEMENT OF THE INVENTION

It is an object of the invention to provide an improved clutch and brake mechanism of relatively simple and economic construction which provides for quick and efficient substantially concurrent braking and declutching of a rotatable working element, such as the blade of a rotating type lawn mower, and the substantially concurrent unbraking and clutching of the rotatable working element.

It is a further object to assure that the motor-driven rotatable working element, such as the blade of a rotating type lawn mower, does not continue to rotate for any appreciable length of time after the working element is declutched and no longer being motor-driven.

Another object is to improve safety in the use of machines having rotatable working elements such as rotating type lawn mowers having blades driven by the mower motor.

A further object is to facilitate the control of the rotation of a motor-driven rotatable working element, such as the blade of a rotary type lawn mower, by use of a "dead-man" control, by assuring that the rotation of the rotatable working element by the still operating motor stops very quickly after the "dead-man" control is released.

Another object is to provide more responsive control of the rotation of a rotatable working element, such as the blade of a rotary type lawn mower, to assure that upon declutching of the working element from a driving motor, the rotation of the working element is almost simultaneously braked to discontinue rotation, and also to assure that upon clutching of the working element to the driving motor, the working element is not braked but is free to rotate.

Other objects and advantages may be observed from the following description of the invention in conjunction with the several drawings.

FIGURES OF THE DRAWINGS

DESCRIPTION OF THE INVENTION HEREIN DISCLOSED

The present invention is here described in connection with its use in a rotary type lawn mower having a motor driven blade for which use it is especially adapted, although it is also useful in connection with other machines having a motor driven rotatable working element. The best and preferred embodiment of the invention as presently known to the inventors is as herein disclosed.

Figure 1:
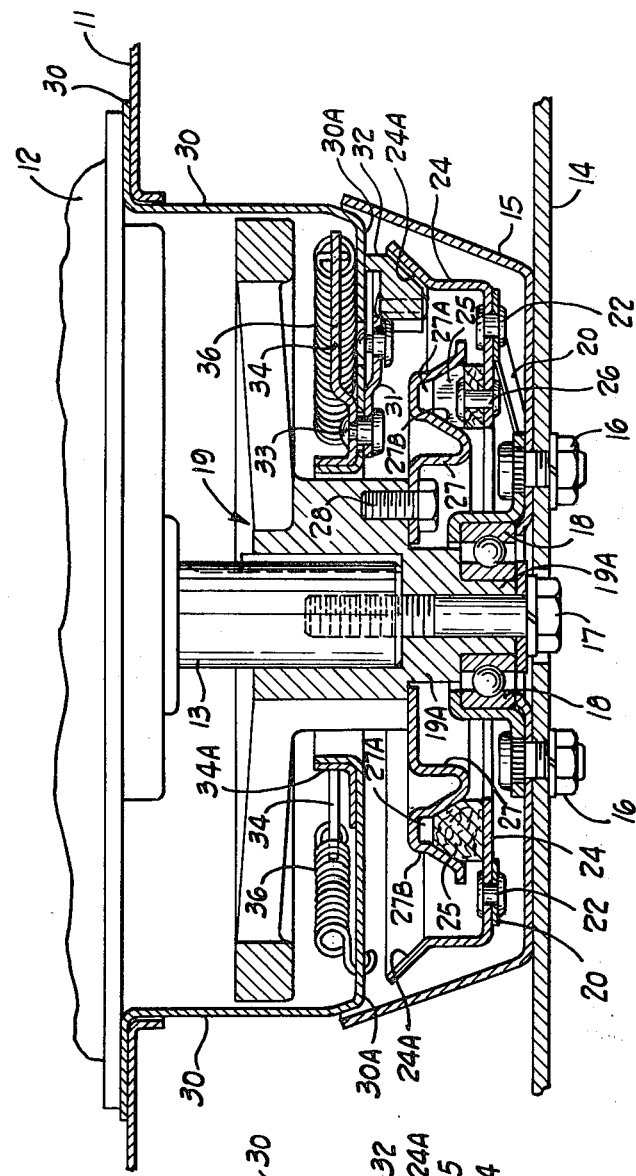
FIG. 1 is a longitudinal sectional view taken through the improved brake and clutch mechanism and illustrating the parts in a clutched and unbraked condition.

The lawn mower to which the invention is here applied has a motor or engine 12, which may be an internal combustion type motor or an electric motor, which is mounted on a mower housing 11. A fragmentary portion of the housing 11 and motor 12 is shown in FIG. 1. Extending downwardly from motor 12 is an upright driving shaft 13 adapted to rotate parts carried thereby when clutched to the shaft.

A fan member 19 having a fan hub portion 19A is splined to the shaft 13 so as to rotate with the shaft. Secured to the lower end of the fan body 19A a bolt 17 is a bearing assembly 18. The mounting is such that the inner race of bearing assembly 18 is rotated by the fan body 19A and shaft 13 to which it is secured. The outer race of bearing assembly 18 is rotatable around the bolt 17 and fan body 19A and shaft 13, or conversely may remain stationary while the shaft 13, fan body 19A and bolt 17 may rotate.

A cup-shaped rotatable member 15 is secured to a rotatable cutting blade 14, shown fragmentarily in FIG. 1, by nut and bolt assemblies 16, so that in the position illustrated the blade 14 and rotatable member 15 carried on the outer race of assembly 18 may rotate in unison. Thus, the blade 14 and rotatable member 15 are not rotated by the shaft 13 unless and until the clutching mechanism is operated to drivingly engage the blade 14 and rotatable member 15 with the shaft.

These are four leaf springs 20 uniformly distributed around on the upper surface of the rotatable member 15. These leaf springs 20 have their lower ends secured by rivets 21, studs or other suitable securing means to the rotatable member 15. The leaf springs 20 are bent or formed as to extend upwardly and are so biased as to exert an upward thrust at their upper ends away from the rotatable member 15.

An annular rotor member 24 is concentrically mounted around the fan body 19A at a location above the rotatable member 15. The rotor member 24 is carried on the rotatable member 15 by means of springs 20 through the securement of the upper ends of springs 20 by rivets 22, studs or other suitable means to the rotor member 24. The bias of springs 20 is such as to resiliently urge the rotor member 24 upwardly away from the rotatable member 15. In effect, the rotor member 24 "floats" on the rotatable member 15 and is carried thereby so that rotor member 24 and rotatable member 15 may rotate in unison about the axis of shaft 13.

Figure 3:
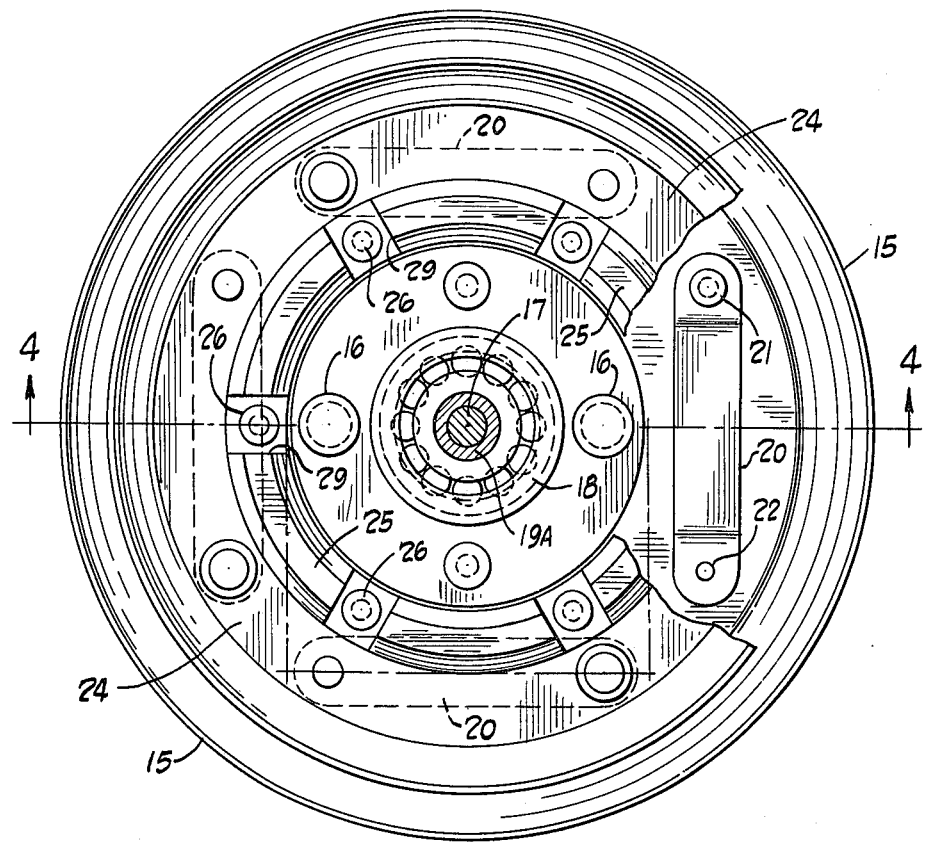
FIG. 3 is a plan view looking down on the lower portion of the mechanism, which lower portion is rotatable with the working element or blade.
Figure 4:
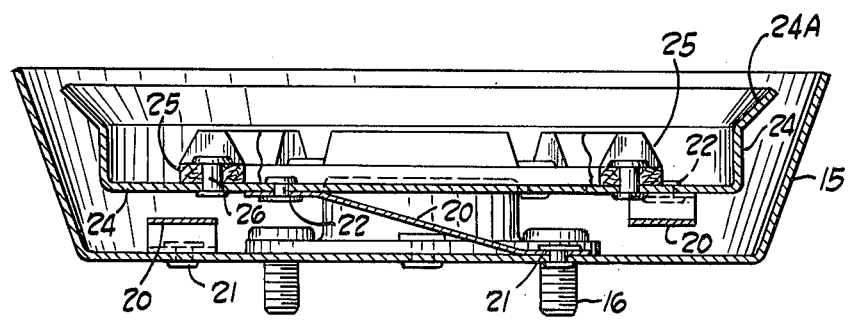
FIG. 4 is a cross-sectional view taken through the line 4—4 of FIG. 3, and showing the lower portion of the mechanism.

Mounted on the rotor member 24 is a first friction member 25 in annular form and disposed concentrically around the axis of the shaft 13. As seen in FIGS. 3 and 4 the first friction element 25 is notched at spaced locations 29 around its periphery, and rivets 26, or studs at these notched locations secure the first friction element to the rotor member 24 to be rotatable therewith.

The first friction element 25 is preferably composed of molded organic brake material variously comprised of different compositions of resin, asbestos, lignin derivatives, powdered metal and other known brake material appropriate friction and wear characteristics.

The first friction element 25 has two opposite sides spaced radially of each other which are inclined toward each other and are disposed at acute angles to the axis of shaft 13, as illustrated.

A cone clutch member 27 in annular form is secured by bolts 8 to the fan body 19A whereby the clutch member 27 rotates with the shaft 13. This clutch member 27 has an annular recess 27A formed therein, the recess being directed downwardly toward the first friction element 25. The inner walls 27B of annular recess 27A are inclined toward each other as shown and complement the opposite inclined surfaces of the first friction element 25. The walls 27B provide clutching surfaces that are clutchingly engageable by the opposite inclined surfaces of first friction element 25 upon the first friction element 25 being resiliently thrust upwardly by the resilient bias of leaf springs 20.

The outer peripheral edge portion of rotor member 24 is inclined radially outward to provide the annular braking surface 24A on the inner side of the peripheral portion. As the whole rotor member 24 is carried on leaf springs 20 so too the annular braking surface 24A is resiliently urged upwardly, but is capable of being urged downwardly against the bias of springs 20.

A cupped member 30 is centrally located in an open space in housing 11 beneath the motor 12. This cupped member is in effect an extension of the housing 11 and is concentric with the shaft 13. The lower portion of cupped member 30 is turned inward to provide the flange portion 30A which extends radially inward to a flange concentric with fan body 19A.

Figure 2:
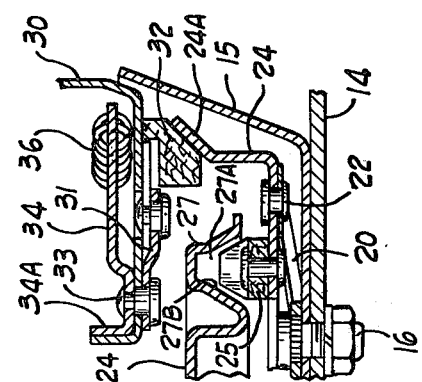
FIG. 2 is a partial longitudinal sectional view similar to that on the right hand side of FIG. 1, but showing the parts in an unclutched and braked condition.
Figure 6:
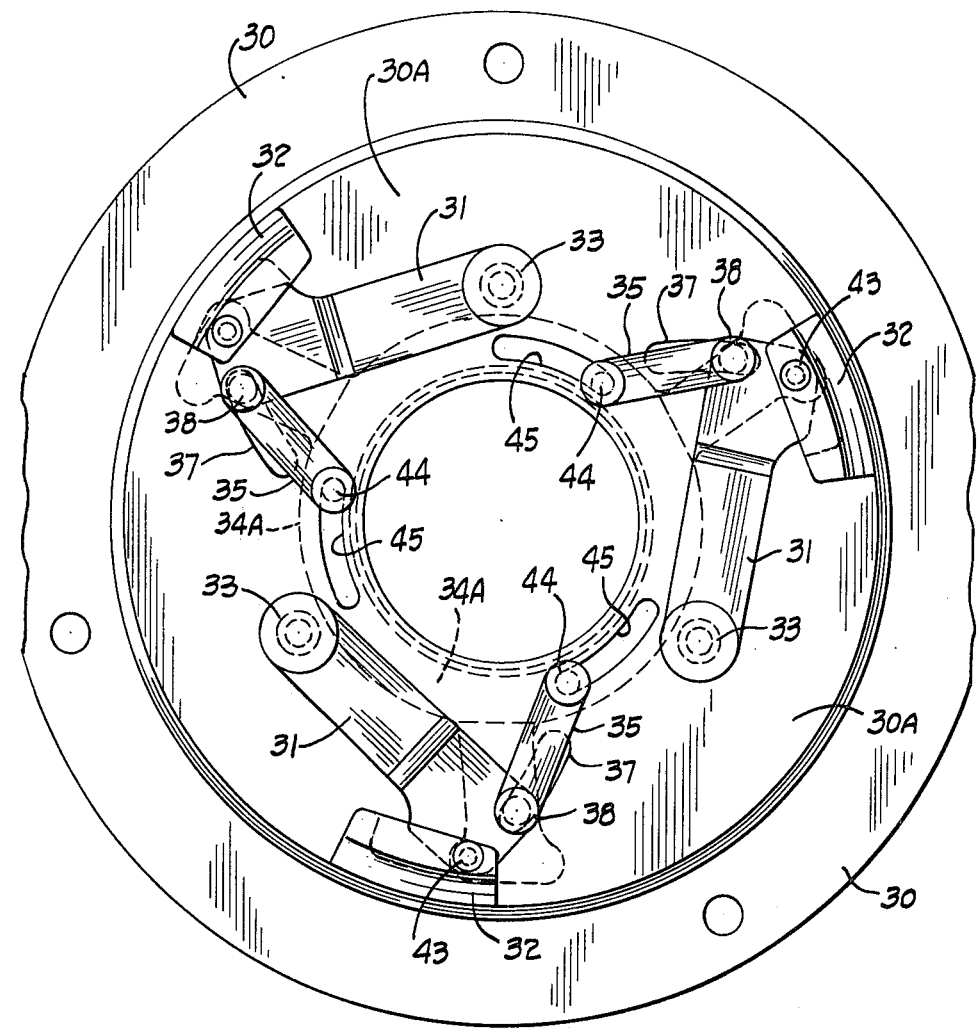
FIG. 6 is a view looking upward upon the bottom side of the upper portion of the mechanism shown in FIG. 5.

As illustrated in FIGS. 1, 2 and 6, pivotally mounted by pivot pins 33 are three arm members 31 disposed to swing in arcs radially toward and away from the axis of shaft 13. Mounted on the outer free ends of arm members 31 by means of pivot pins 43 are second friction elements 32. These second friction elements may be of a composition similar to that of first friction element 25.

Links 35 are also connected by pins 38 to the outer free ends of arm members 31, as seen in FIG. 6. For guiding the swinging movement of arm members 31 in a horizontal plane normal to the axis of shaft 13, the pins 38 move along in arcuate slots 37 as the arm members 31 swing. The inner ends of linke 35 are secured to pins 44 which extend through arcuate slots 45 to the upper side of flange portion 30A (as shown in FIG. 5).

The parts shown in FIG. 6 are disposed on the under side of the flange portion 30A of cupped member 30. However, the parts shown in FIG. 5 are disposed on the upper side of the flange portion 30A. The pins 44 extending through the arcuate slots 45 on the side shown in FIG. 5 are connected to an actuating member 34. This actuating member as seen in FIG. 5 has a central annular portion 34A from which three equidistantly arms extend radially outward. The central portion 34A is rotatable around the inner ring-like lip of flange portion 30A of cupped member 30.

The outermost ends of the arms of actuating member 34 are connected to coil springs 36, one end of each spring 36 being connected to an arm of actuating member 34 and the other end being anchored to the flange portion 30A of cupped member 30 by means of being hooked in holes in flange portion 30A. The springs 36 are tension springs and exert a resilient bias urging the actuating member 34 to rotate in a counterclockwise direction as seen in FIG. 5.

Figure 5:
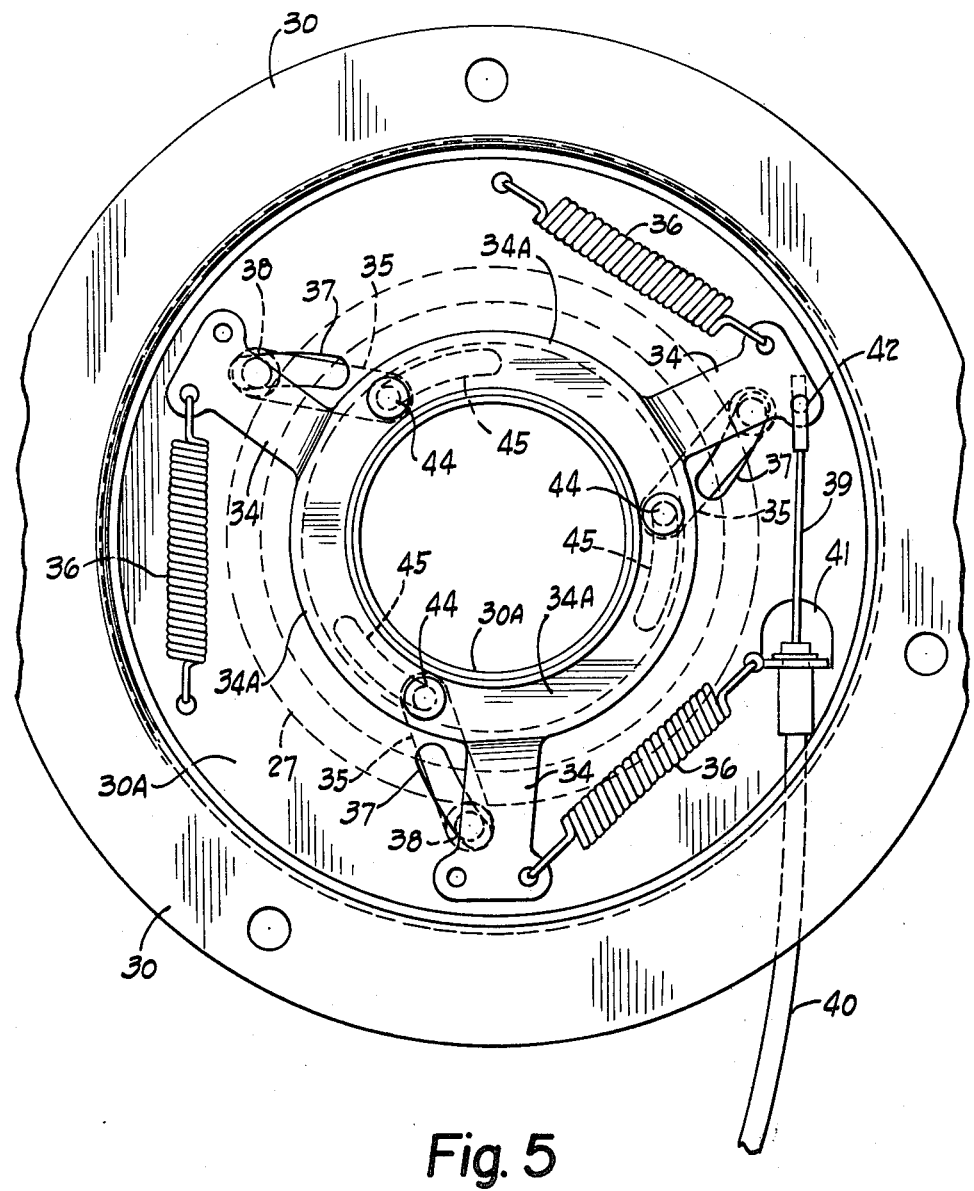
FIG. 5 is a plan view looking down on the upper portion of the mechanism carried by the mower, which upper portion carries the actuating means for actuating the mechanism.

A cable or wire 39 is secured by connection 42 to the outer end of one of the arms of actuating member 34 as illustrated in FIG. 5. The cable or wire 39 is slidably received in a sheath or tube 40 which has its end anchored to a bracket 41 secured to the top of flange portion 30A of cupped member 30. The cable or wire 39 is guided by the sheath or tube 40 and slidable moves through the sheath or tube 40 in the normal manner.

The other end (not shown) of cable or wire 39 is connected to a control lever mounted, for example, on the handle of the lawn mower within reach of the operator of the lawn mower. Preferably, the control lever (not shown) is a dead-man control lever which must be continued to be held or gripped by the operator in order for the blade of the mower to continue its cutting function.

A pull and continued tension on the cable or wire 39 by the operator's use of the control lever, such as a dead-man control lever, rotates the actuating member 34 in opposition to the resilient bias of the springs 36. In this movement the actuating member rotates in a clockwise direction as seen in FIG. 5.

By means of the pins 55 pivotally connected to the ring portion 34A of actuating member 34 extending through the flange portion 30A of cupped member 30 and connected on the under side (shown in FIG. 6) of the flange portion 30A, to the inner ends of links 35 which have their outer ends pivotally connected by pins 38 to arm members 31, the arm members 31 are swung on the axes of the respective pivot pins 33.

The pull or tension on cable or wire 39 rotating the actuating member 34 in a clockwise direction (as shown in FIG. 5) on the upper side of the flange portion 30A concurrently, by the described connection, swings the arm members 31 to draw or move the second friction elements 32 radially inward toward the axis of shaft 13 and away from the inclined braking surface 24A of rotor member 24 (as illustrated in FIG. 1). Contrariwise, release or pull on the cable or wire 39 permits the actuating member 34, under the resilient tension of springs 36, to rotate in a counterclockwise direction (as seen in FIG. 5). This in turn, through the described connections causes the arm members 31 to be swung outwardly on their pivot pins 33 to press the second friction elements 32 outward and in braking engagement with, and against, the inclined braking surface of the rotor member 24 (as illustrated in FIG. 2).

Upon the second friction element 32 being withdrawn and away from the braking surface 24A of rotor member 32, as seen in FIG. 1, there is no braking action. At the same time the rotor member 24 is raised sufficiently by the leaf springs 20 so as to press the first friction element 25 upwardly away from rotatable member 15 and in clutching engagement with, and against, the inner walls 27B of clutch member 27. This provides for a clutched engagement whereby the rotatable member 15 and blade 14 will be rotated by the rotor member 27, fan body 19, and shaft 13.

This clutched interengagement continues as long as the second friction elements 32 are held withdrawn from the inclined braking surface 24A of rotor member 24 and the mechanism is maintained in an unbraked condition. However, upon the second friction elements 32 moving radially outward under the resilient compulsion of springs 36, as when tension or pull on cable 39 is released, the second friction elements 32 cammingly press down on the inclined braking surface 24A of rotor member 24. This moves the rotor member 24 downwardly against the resilient bias of leaf springs 20 and thereby moves the first friction element 25 downwardly away from, and out of clutching engagement with the inner inclined walls 27B of clutch member 27.

In this manner, when the mechanism is placed in a braked condition, it is concurrently placed in an unclutched condition. When the mechanism is placed in a clutched condition, it is concurrently placed in an unbraked condition. By "concurrently" it is meant that the operations are almost, if not precisely, contemporaneous. A few seconds lapse between the braking and clutching operations is so small that they may be regarded from a practical point of view as occurring concurrently.

Thus, a rotary lawn mower, for example, may be so operated that upon the operator maintaining a grasp on the control lever, such as a dead-man control lever, while the motor is operating, the mechanism will be in a clutched and unbraked condition and the blade will continue to rotate. However, upon the operator releasing a grasp on the control lever, such as a dead-man control lever, the mechanism will automatically operate to both an unclutched and braked condition so that the blade's rotation is quickly terminated, being no longer driven by the shaft and also being braked.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a brake and clutch mechanism for a rotary type lawn mower having a motor mounted on the mower housing, a motor-driven shaft extending from the housing, and a cutting blade mounted on the free end of the shaft and adapted to be rotated by the shaft, the improvement comprising in combination, a rotatable carrying member concentrically mounted about said shaft adjacent the free end of the shaft and adapted to be secured to the blade to rotate with the blade, said rotatable member being unsecured to said shaft to be free to rotate independently of said shaft, a rotor member mounted to the rotatable carrying member to rotate therewith, a resilient member interconnecting said rotatable carrying member and said rotor member and biased to urge the said rotor away from said rotatable carrying member parallel to the axis of said shaft, a first friction element carried by the rotor member and movable therewith toward and away from said rotatable carrying member, a clutch cone member concentrically mounted about said shaft to rotate with said shaft, said clutch cone member having engaging surfaces aligned with said first friction element to clutchingly engage the friction element upon the said resilient member urging the said rotor member away from said rotatable carrying member, said rotor member having a braking surface movable with the rotor member about the axis of said shaft, a second friction element disposed to engage said braking surface of the rotor member, an arm member carried by the mower holding said second friction element, an actuating member for moving the arm member to shift the second friction element carried by the arm member into and out of braking engagement with the said braking surface to brake and unbrake the rotation of said rotor, said second friction element and said braking surface being disposed to face each other so as to impart to the rotor member a component of force which moves the rotor member toward the rotatable carrying member against the resilient urging of the resilient member upon the second friction element being moved into braking engagement with said braking surface to simultaneously terminate the clutching engagement of the rotor member and first friction element, in the engaged condition of the second friction element, the spacing between the said braking surface and the corresponding surface of the second friction element that is engageable by the said braking surface being different from the spacing between the clutch cone member and the corresponding surface of the first friction element that is engageable by the clutch cone member to assure a difference between the occurrence of the engagement of the second friction element with said braking surface and the occurrence of the engagement of the first friction element and the said clutch cone member.

2. The improvement claimed in claim 1 and in which said resilient member comprises a plurality of leaf springs interposed between the said rotatable carrying member and said rotor member and distributed about the resilient carrying member concentrically of said shaft, the leaf springs being biased to urge the said rotor member away from said rotatable carrying member.

3. The improvement claimed in claim 1 and in which said first friction element is annular in form and is disposed concentrically of said shaft, said first friction element having side engaging surfaces inclined at an acute angle to the axis of said shaft, and said clutch cone member has engaging surfaces disposed concentrically of said shaft, said engaging surfaces being inclined to complement the side engaging surfaces of said first friction element.

4. The improvement claimed in claim 3 and in which the said side engaging surfaces of the first friction element are inclined toward each other, and in which the engaging surfaces of the clutch cone member are inclined toward each other and are disposed over the said side engaging surfaces of the first friction element in position to engage the same upon upward movement of the first friction element.

5. In a brake and clutch mechanism of a machine for controlling the clutching and braking of a rotatable working tool driven by a rotatable engine-driven shaft, the improvement comprising in combination a rotatable member concentrically mounted about said shaft and rotatable with said working tool, the rotatable member being free to rotate about said shaft upon the mechanism being in unclutched condition, a rotor concentrically mounted about said shaft and carried by said rotatable member to rotate therewith, a first friction element carried by said rotor to rotate therewith about the axis of said shaft in a first plane normal to the axis of said shaft, a second friction element carried by the machine and disposed in a second plane parallel to the said first plane and spaced therefrom, a supporting member for supporting said second friction element, an actuating member connected to said supporting member for moving said supporting member for moving the second friction element in said second plane toward and away from the axis of said shaft, a resilient member inter-connecting said rotor and rotatable member and disposed to resiliently urge the rotor and first friction element carried thereby from said rotatable member toward said second plane, the said rotor having a first portion carrying said first friction element and movable therewith away from said rotatable member, the said rotor having a second portion carrying a braking surface, and a clutch part carried by and rotatable with said shaft and juxtaposed to said first friction element to be clutchingly engaged by the first friction element upon movement of the first friction element toward the said clutch part, the first and second portions of said rotor being so spaced apart that upon the second friction element being moved to brakingly engage the braking surface of the rotor, the rotor is moved away from said second plane to disengage said first friction element from the said clutch part for de-clutching the rotor, rotatable member, and working tool from said shaft.

6. The improvement claimed in claim 5 and in which said first friction element is annular to be disposed around said shaft and has opposite engaging surfaces disposed at an incline toward each other and said clutch part has opposite clutching surfaces complementing the opposite engaging surfaces of the first friction element to clutchingly engage the same upon movement of the rotor and first friction element carried thereby toward said second plane by the resilient bias of said resilient member.

7. The improvement claimed in claim 5 and in which said braking surface of the rotor is inclined at an acute angle to the axis of said shaft, and the second friction element has a braking surface correspondingly inclined to the axis of the shaft to complement the said braking surface of the second friction element.

8. The improvement claimed in claim 5 and in which said clutch part includes an annular recess with inwardly inclined walls and the first friction element includes an annular protruding part adapted to complementarily fit into said recess and to clutchingly enage said inclined walls upon movement of the first friction element by the resilient bias of the resilient member.

* * * * *